(12) United States Patent
Carasso et al.

(10) Patent No.: US 11,709,850 B1
(45) Date of Patent: Jul. 25, 2023

(54) USING A TIMESTAMP SELECTOR TO SELECT A TIME INFORMATION AND A TYPE OF TIME INFORMATION

(71) Applicant: SPLUNK INC., San Francisco, CA (US)

(72) Inventors: R. David Carasso, San Rafael, CA (US); Micah James Delfino, San Francisco, CA (US)

(73) Assignee: Splunk Inc., San Francisco, CA (US)

(*) Notice: Subject to any disclaimer, the term of this patent is extended or adjusted under 35 U.S.C. 154(b) by 0 days.

(21) Appl. No.: 17/443,892

(22) Filed: Jul. 28, 2021

Related U.S. Application Data

(63) Continuation of application No. 16/394,754, filed on Apr. 25, 2019, now Pat. No. 11,106,691, which is a continuation of application No. 15/582,599, filed on Apr. 28, 2017, now Pat. No. 10,318,537, which is a continuation of application No. 13/747,177, filed on Jan. 22, 2013, now abandoned.

(51) Int. Cl.
*G06F 17/00* (2019.01)
*G06F 16/2458* (2019.01)
*G06F 16/901* (2019.01)
*G06F 40/284* (2020.01)

(52) U.S. Cl.
CPC ...... *G06F 16/2477* (2019.01); *G06F 16/9014* (2019.01); *G06F 40/284* (2020.01)

(58) Field of Classification Search
CPC . G06F 16/2477; G06F 16/9014; G06F 40/284
See application file for complete search history.

(56) References Cited

U.S. PATENT DOCUMENTS 5,550,971 A  8/1996 Brunner et al.
5,913,032 A  6/1999 Schwartz et al.
(Continued)

OTHER PUBLICATIONS

Aho, A.V., et al., "Columbia digital news project: an environment for briefing and search over multimedia information," International Journal on Digital Libraries, vol. 1, No. 4, pp. 377-385 (Mar. 1998).
(Continued)

*Primary Examiner* — Greta L Robinson
(74) *Attorney, Agent, or Firm* — Shook, Hardy & Bacon L.L.P.

(57) ABSTRACT

Embodiments are directed towards a graphical user interface identify locations within event records with splittable timestamp information. A display of event records is provided using any of a variety of formats. A splittable timestamp selector allows a user to select one or more locations within event records as having time related information that may be split across the one or more locations, including, information based on date, time of day, day of the week, or other time information. Any of a plurality of mechanisms is used to associate the selected locations with the split timestamp information, including tags, labels, or header information within the event records. In other embodiments, a separate table, list, index, or the like may be generated that associates the selected locations with the split timestamp information. The split timestamp information may be used within extraction rules for selecting subsets or the event records.

20 Claims, 9 Drawing Sheets

(56) References Cited

U.S. PATENT DOCUMENTS

| | | | |
|---|---|---|---|
| 6,049,777 A | 4/2000 | Sheena et al. | |
| 6,112,186 A | 8/2000 | Bergh et al. | |
| 6,118,936 A | 9/2000 | Lauer et al. | |
| 6,208,720 B1 | 3/2001 | Curtis et al. | |
| 6,311,194 B1 | 10/2001 | Sheth et al. | |
| 6,347,374 B1 | 2/2002 | Drake et al. | |
| 6,374,251 B1 | 4/2002 | Fayyad et al. | |
| 6,549,208 B2 | 4/2003 | Maloney et al. | |
| 6,609,128 B1 | 8/2003 | Underwood | |
| 6,718,535 B1 | 4/2004 | Underwood | |
| 6,839,669 B1 | 1/2005 | Gould et al. | |
| 6,954,756 B2 | 10/2005 | Arning et al. | |
| 7,035,925 B1 | 4/2006 | Nareddy et al. | |
| 7,085,682 B1 | 8/2006 | Heller et al. | |
| 7,100,195 B1 | 8/2006 | Underwood | |
| 7,136,880 B2 | 11/2006 | Wilkins et al. | |
| 7,219,239 B1 | 5/2007 | Njemanze et al. | |
| 7,376,969 B1 | 5/2008 | Njemanze et al. | |
| 7,389,306 B2 | 6/2008 | Schuetze et al. | |
| 7,503,012 B2 | 3/2009 | Chen et al. | |
| 7,562,069 B1 | 7/2009 | Chowdhury et al. | |
| 7,644,414 B2 | 1/2010 | Smith et al. | |
| 7,650,512 B2 | 1/2010 | Karimisetty et al. | |
| 7,650,638 B1 | 1/2010 | Njemanze et al. | |
| 7,702,639 B2 | 4/2010 | Stanley et al. | |
| 7,769,899 B2 | 8/2010 | Grabamik et al. | |
| 7,779,021 B1 | 8/2010 | Smith et al. | |
| 7,805,482 B2 | 9/2010 | Schiefer | |
| 7,809,131 B1 | 10/2010 | Njemanze et al. | |
| 7,899,783 B1 | 3/2011 | Xu et al. | |
| 7,958,164 B2 | 6/2011 | Ivanov et al. | |
| 8,022,987 B2 | 9/2011 | Ko et al. | |
| 8,112,398 B1 | 2/2012 | Hernandez | |
| 8,121,973 B2 | 2/2012 | Anderson et al. | |
| 8,200,506 B2 | 6/2012 | Kil | |
| 8,412,696 B2 | 4/2013 | Zhang et al. | |
| 8,442,950 B2 | 5/2013 | D'Souza et al. | |
| 8,442,982 B2 | 5/2013 | Jacobson et al. | |
| 8,458,612 B2 | 6/2013 | Chatterjee et al. | |
| 8,516,008 B1 | 8/2013 | Marquardt et al. | |
| 8,578,500 B2 | 11/2013 | Long | |
| 8,589,403 B2 | 11/2013 | Marquardt et al. | |
| 8,682,925 B1 | 3/2014 | Marquardt et al. | |
| 8,700,658 B2 | 4/2014 | Rambhia et al. | |
| 8,713,000 B1 | 4/2014 | Elman et al. | |
| 8,751,855 B2 | 6/2014 | Yair et al. | |
| 8,752,178 B2 | 6/2014 | Coates et al. | |
| 8,788,526 B2 | 7/2014 | Neels et al. | |
| 8,806,361 B1 | 8/2014 | Noel et al. | |
| 8,826,434 B2 | 9/2014 | Merza | |
| 8,965,889 B2 | 2/2015 | Chan et al. | |
| 9,037,667 B2 | 5/2015 | Rivkin | |
| 9,077,715 B1 | 7/2015 | Satish et al. | |
| 9,124,612 B2 | 9/2015 | Vasan et al. | |
| 9,130,971 B2 | 9/2015 | Vasan et al. | |
| 9,185,007 B2 | 11/2015 | Fletcher et al. | |
| 9,189,064 B2 | 11/2015 | Chaudhri et al. | |
| 9,215,240 B2 | 12/2015 | Merza et al. | |
| 9,262,357 B2 | 2/2016 | Accapadi et al. | |
| 9,269,095 B1 | 2/2016 | Chan et al. | |
| 9,292,361 B1 | 3/2016 | Chitilian et al. | |
| 9,298,854 B2 * | 3/2016 | Ikawa | G06F 16/2477 |
| 9,363,149 B1 | 6/2016 | Chauhan et al. | |
| 9,516,052 B1 | 12/2016 | Chauhan et al. | |
| 9,582,557 B2 | 2/2017 | Carasso et al. | |
| 9,588,667 B2 | 3/2017 | Singhal et al. | |
| 9,740,788 B2 | 8/2017 | Blank, Jr. et al. | |
| 9,747,010 B2 | 8/2017 | Prabhat et al. | |
| 9,778,834 B2 | 10/2017 | Evans et al. | |
| 9,798,952 B2 | 10/2017 | Kawazu | |
| 9,864,797 B2 | 1/2018 | Fletcher et al. | |
| 9,875,319 B2 | 1/2018 | Wolfram et al. | |
| 9,904,456 B2 | 2/2018 | Xie et al. | |
| 9,922,084 B2 | 3/2018 | Robichaud | |
| 9,922,099 B2 | 3/2018 | Lamas et al. | |
| 9,923,767 B2 | 3/2018 | Dickey | |
| 9,967,351 B2 | 5/2018 | Maheshwari et al. | |
| 9,977,803 B2 | 5/2018 | Robichaud et al. | |
| 9,996,446 B2 | 6/2018 | Lefor et al. | |
| 10,019,496 B2 | 7/2018 | Bingham et al. | |
| 10,026,045 B1 | 7/2018 | Portnoy et al. | |
| 10,031,905 B2 | 7/2018 | Fu et al. | |
| 10,061,832 B2 | 8/2018 | Brown et al. | |
| 10,127,255 B1 | 11/2018 | Campbell et al. | |
| 10,127,258 B2 | 11/2018 | Lamas et al. | |
| 10,225,136 B2 | 3/2019 | Bingham et al. | |
| 10,229,150 B2 | 3/2019 | Marquardt et al. | |
| 10,248,739 B2 | 4/2019 | Hamada | |
| 10,318,541 B2 | 6/2019 | Bingham et al. | |
| 10,353,957 B2 | 7/2019 | Bingham et al. | |
| 10,387,396 B2 | 8/2019 | Marquardt et al. | |
| 10,409,794 B2 | 9/2019 | Marquardt et al. | |
| 10,417,120 B2 | 9/2019 | Maag et al. | |
| 10,474,674 B2 | 11/2019 | Marquardt et al. | |
| 10,565,220 B2 | 2/2020 | Porath et al. | |
| 10,585,788 B2 | 3/2020 | Nallabothula et al. | |
| 10,614,132 B2 | 4/2020 | Bingham et al. | |
| 10,621,762 B2 | 4/2020 | Donalek et al. | |
| 10,672,161 B2 | 6/2020 | Maruyama et al. | |
| 10,698,896 B2 | 6/2020 | Halterman et al. | |
| 10,771,486 B2 | 9/2020 | Murphey et al. | |
| 10,775,976 B1 | 9/2020 | Abdul-Jawad et al. | |
| 10,776,441 B1 | 9/2020 | Echeverria et al. | |
| 10,778,712 B2 | 9/2020 | Chauhan et al. | |
| 10,783,195 B2 | 9/2020 | Musuluri | |
| 10,795,555 B2 | 10/2020 | Burke et al. | |
| 10,832,456 B1 | 11/2020 | Levy | |
| 10,848,510 B2 | 11/2020 | Chauhan et al. | |
| 10,885,450 B1 | 1/2021 | Kaitha | |
| 10,896,205 B2 | 1/2021 | Krishna et al. | |
| 10,915,338 B2 | 2/2021 | Lawrence | |
| 10,915,583 B2 | 2/2021 | Robichaud et al. | |
| 10,922,083 B2 | 2/2021 | Balasubramanian et al. | |
| 10,922,341 B2 | 2/2021 | De Boer | |
| 10,922,493 B1 | 2/2021 | Das et al. | |
| 10,922,660 B2 | 2/2021 | Rakshit et al. | |
| 10,922,892 B1 | 2/2021 | Bhushan et al. | |
| 10,942,774 B1 | 3/2021 | Aleti et al. | |
| 10,985,970 B1 | 4/2021 | Goyal et al. | |
| 10,997,180 B2 | 5/2021 | James et al. | |
| 10,997,190 B2 | 5/2021 | Porath et al. | |
| 10,997,192 B2 | 5/2021 | Boster et al. | |
| 10,999,164 B1 | 5/2021 | Sridhar et al. | |
| 11,061,918 B2 | 7/2021 | Miller et al. | |
| 11,138,191 B1 | 10/2021 | De Boer | |
| 11,151,125 B1 | 10/2021 | Dwivedi et al. | |
| 11,194,564 B1 | 12/2021 | Dwivedi et al. | |
| 11,222,066 B1 | 1/2022 | Batsakis et al. | |
| 11,226,964 B1 | 1/2022 | Cairney et al. | |
| 11,231,840 B1 | 1/2022 | Burke et al. | |
| 11,232,100 B2 | 1/2022 | Bhattacharjee et al. | |
| 11,245,581 B2 | 2/2022 | Hsiao et al. | |
| 11,263,229 B1 | 3/2022 | Basavaiah et al. | |
| 11,269,876 B1 | 3/2022 | Basavaiah et al. | |
| 11,327,827 B1 | 5/2022 | Satish et al. | |
| 11,386,133 B1 | 7/2022 | Neels et al. | |
| 2001/0032205 A1 | 10/2001 | Kubaitis | |
| 2002/0049740 A1 | 4/2002 | Arning et al. | |
| 2002/0049838 A1 | 4/2002 | Sylor et al. | |
| 2002/0054101 A1 | 5/2002 | Beatty | |
| 2002/0133513 A1 | 9/2002 | Townsend et al. | |
| 2003/0061212 A1 | 3/2003 | Smith et al. | |
| 2003/0115333 A1 | 6/2003 | Cohen et al. | |
| 2003/0120475 A1 | 6/2003 | Nakamura | |
| 2003/0126056 A1 | 7/2003 | Hausman et al. | |
| 2003/0167192 A1 | 9/2003 | Santos et al. | |
| 2003/0187821 A1 | 10/2003 | Cotton et al. | |
| 2004/0010497 A1 | 1/2004 | Bradley et al. | |
| 2004/0078359 A1 | 4/2004 | Bolognese et al. | |
| 2004/0133566 A1 | 7/2004 | Ishiguro et al. | |
| 2004/0220965 A1 | 11/2004 | Harville et al. | |
| 2004/0225641 A1 | 11/2004 | Dettinger et al. | |
| 2004/0243614 A1 | 12/2004 | Boone et al. | |
| 2004/0254919 A1 | 12/2004 | Giuseppini | |

(56) References Cited

U.S. PATENT DOCUMENTS

| | | |
|---|---|---|
| 2005/0015624 A1 | 1/2005 | Ginter et al. |
| 2005/0022207 A1 | 1/2005 | Grabamik et al. |
| 2005/0114707 A1 | 5/2005 | DeStefano et al. |
| 2005/0160086 A1 | 7/2005 | Haraguchi et al. |
| 2005/0172162 A1 | 8/2005 | Takahashi et al. |
| 2005/0203876 A1 | 9/2005 | Cragun et al. |
| 2005/0235356 A1 | 10/2005 | Wang |
| 2006/0053174 A1 | 3/2006 | Gardner et al. |
| 2006/0074621 A1 | 4/2006 | Rachman |
| 2006/0112123 A1 | 5/2006 | Clark et al. |
| 2006/0129554 A1 | 6/2006 | Suyama et al. |
| 2006/0143159 A1 | 6/2006 | Chowdhury et al. |
| 2006/0173917 A1 | 8/2006 | Kalmick et al. |
| 2006/0190804 A1 | 8/2006 | Yang |
| 2006/0225001 A1 | 10/2006 | Sylthe et al. |
| 2006/0253423 A1 | 11/2006 | McLane et al. |
| 2006/0253790 A1 | 11/2006 | Ramarajan et al. |
| 2006/0265397 A1 | 11/2006 | Bryan et al. |
| 2006/0271520 A1 | 11/2006 | Ragan |
| 2006/0277482 A1 | 12/2006 | Hoffman et al. |
| 2006/0293979 A1 | 12/2006 | Cash et al. |
| 2007/0043703 A1 | 2/2007 | Bhattacharya et al. |
| 2007/0061735 A1 | 3/2007 | Hoffberg et al. |
| 2007/0061751 A1 | 3/2007 | Cory et al. |
| 2007/0100834 A1 | 5/2007 | Landry et al. |
| 2007/0118491 A1 | 5/2007 | Baum et al. |
| 2007/0209080 A1 | 9/2007 | Ture et al. |
| 2007/0214134 A1 | 9/2007 | Haselden et al. |
| 2007/0214164 A1 | 9/2007 | MacLennan et al. |
| 2007/0239694 A1 | 10/2007 | Singh et al. |
| 2008/0021748 A1 | 1/2008 | Bay et al. |
| 2008/0097789 A1 | 4/2008 | Huffer |
| 2008/0104046 A1 | 5/2008 | Singla et al. |
| 2008/0104542 A1 | 5/2008 | Cohen et al. |
| 2008/0134071 A1 | 6/2008 | Keohane et al. |
| 2008/0177689 A1 | 7/2008 | Jeng et al. |
| 2008/0208820 A1 | 8/2008 | Usey et al. |
| 2008/0215546 A1 | 9/2008 | Baum et al. |
| 2008/0222125 A1 | 9/2008 | Chowdhury |
| 2008/0235277 A1* | 9/2008 | Mathew ............... G06F 16/2477 |
| 2008/0249858 A1 | 10/2008 | Angell et al. |
| 2008/0270366 A1 | 10/2008 | Frank |
| 2008/0291030 A1 | 11/2008 | Pape et al. |
| 2008/0294740 A1 | 11/2008 | Grabamik et al. |
| 2008/0301095 A1 | 12/2008 | Zhu et al. |
| 2008/0306980 A1 | 12/2008 | Brunner et al. |
| 2008/0320033 A1 | 12/2008 | Koistinen et al. |
| 2009/0055523 A1 | 2/2009 | Song et al. |
| 2009/0094207 A1 | 4/2009 | Marvit et al. |
| 2009/0125916 A1 | 5/2009 | Lu et al. |
| 2009/0177689 A1 | 7/2009 | Song et al. |
| 2009/0216867 A1 | 8/2009 | Pusater et al. |
| 2009/0265424 A1 | 10/2009 | Kimoto et al. |
| 2009/0287680 A1 | 11/2009 | Paek et al. |
| 2009/0300065 A1 | 12/2009 | Birchall |
| 2009/0319512 A1 | 12/2009 | Baker et al. |
| 2009/0319941 A1 | 12/2009 | Laansoo et al. |
| 2009/0327319 A1 | 12/2009 | Bertram et al. |
| 2010/0015211 A1 | 1/2010 | Barnett et al. |
| 2010/0017390 A1 | 1/2010 | Yamasaki et al. |
| 2010/0095018 A1 | 4/2010 | Khemani et al. |
| 2010/0106743 A1 | 4/2010 | Brunner et al. |
| 2010/0138377 A1 | 6/2010 | Wright et al. |
| 2010/0223499 A1 | 9/2010 | Panigrahy et al. |
| 2010/0229096 A1 | 9/2010 | Maiocco et al. |
| 2010/0250236 A1 | 9/2010 | Jagannathan et al. |
| 2010/0250497 A1 | 9/2010 | Redlich et al. |
| 2010/0251100 A1 | 9/2010 | Delacourt |
| 2010/0275128 A1 | 10/2010 | Ward et al. |
| 2010/0306281 A1 | 12/2010 | Williamson |
| 2010/0333008 A1 | 12/2010 | Taylor |
| 2011/0029817 A1 | 2/2011 | Nakagawa et al. |
| 2011/0035345 A1 | 2/2011 | Duan et al. |
| 2011/0040724 A1 | 2/2011 | Dircz |
| 2011/0066585 A1 | 3/2011 | Subrahmanyam et al. |
| 2011/0066632 A1 | 3/2011 | Robson et al. |
| 2011/0119219 A1 | 5/2011 | Naifeh et al. |
| 2011/0137836 A1 | 6/2011 | Kuriyama et al. |
| 2011/0153646 A1 | 6/2011 | Hong et al. |
| 2011/0219035 A1 | 9/2011 | Korsunsky et al. |
| 2011/0231223 A1 | 9/2011 | Winters |
| 2011/0246528 A1 | 10/2011 | Hsieh et al. |
| 2011/0246644 A1 | 10/2011 | Hamada |
| 2011/0270877 A1 | 11/2011 | Kim |
| 2011/0276695 A1 | 11/2011 | Maldaner |
| 2011/0295871 A1 | 12/2011 | Foiling et al. |
| 2011/0313844 A1 | 12/2011 | Chandramouli et al. |
| 2011/0314148 A1 | 12/2011 | Petersen et al. |
| 2011/0320450 A1 | 12/2011 | Liu et al. |
| 2012/0023429 A1 | 1/2012 | Medhi |
| 2012/0054675 A1 | 3/2012 | Rajamannar et al. |
| 2012/0079363 A1 | 3/2012 | Folting et al. |
| 2012/0094694 A1 | 4/2012 | Malkin et al. |
| 2012/0101975 A1 | 4/2012 | Khosravy |
| 2012/0117079 A1 | 5/2012 | Baum et al. |
| 2012/0131185 A1 | 5/2012 | Petersen et al. |
| 2012/0137367 A1 | 5/2012 | Dupont et al. |
| 2012/0221553 A1 | 8/2012 | Wittmer et al. |
| 2012/0221559 A1 | 8/2012 | Kidron |
| 2012/0221580 A1 | 8/2012 | Barney |
| 2012/0226779 A1 | 9/2012 | Crucs |
| 2012/0227004 A1 | 9/2012 | Madireddi et al. |
| 2012/0246303 A1 | 9/2012 | Petersen et al. |
| 2012/0283948 A1 | 11/2012 | Demiryurek et al. |
| 2012/0296876 A1 | 11/2012 | Bacinschi et al. |
| 2012/0324329 A1 | 12/2012 | Ceponkus et al. |
| 2013/0007645 A1 | 1/2013 | Kumiawan et al. |
| 2013/0019019 A1 | 1/2013 | Lam |
| 2013/0035961 A1 | 2/2013 | Yegnanarayanan |
| 2013/0041824 A1 | 2/2013 | Gupta |
| 2013/0054642 A1 | 2/2013 | Morin |
| 2013/0054660 A1 | 2/2013 | Zhang |
| 2013/0060912 A1 | 3/2013 | Rensin et al. |
| 2013/0060937 A1 | 3/2013 | Bath et al. |
| 2013/0073542 A1 | 3/2013 | Zhang et al. |
| 2013/0073573 A1 | 3/2013 | Huang et al. |
| 2013/0073957 A1 | 3/2013 | DiGiantomasso et al. |
| 2013/0080190 A1 | 3/2013 | Mansour et al. |
| 2013/0080641 A1 | 3/2013 | Lui et al. |
| 2013/0103409 A1 | 4/2013 | Malkin et al. |
| 2013/0144863 A1 | 6/2013 | Mayer et al. |
| 2013/0173322 A1 | 7/2013 | Gray |
| 2013/0182700 A1 | 7/2013 | Figura et al. |
| 2013/0185643 A1 | 7/2013 | Greifeneder et al. |
| 2013/0205014 A1 | 8/2013 | Muro et al. |
| 2013/0232094 A1 | 9/2013 | Anderson et al. |
| 2013/0238631 A1 | 9/2013 | Carmel et al. |
| 2013/0262371 A1 | 10/2013 | Nolan |
| 2013/0318236 A1 | 11/2013 | Coates et al. |
| 2014/0019909 A1 | 1/2014 | Leonard et al. |
| 2014/0046976 A1 | 2/2014 | Zhang et al. |
| 2014/0082513 A1 | 3/2014 | Mills et al. |
| 2014/0129942 A1 | 5/2014 | Rathod |
| 2014/0160238 A1 | 6/2014 | Yim et al. |
| 2014/0324862 A1 | 10/2014 | Bingham et al. |
| 2015/0019537 A1 | 1/2015 | Neels et al. |
| 2015/0058318 A1 | 2/2015 | Blackwell et al. |
| 2015/0109305 A1 | 4/2015 | Black |
| 2015/0213631 A1 | 7/2015 | Vander Broek |
| 2015/0222604 A1 | 8/2015 | Ylonen |
| 2015/0278153 A1 | 10/2015 | Leonard et al. |
| 2015/0278214 A1 | 10/2015 | Anand et al. |
| 2015/0294256 A1 | 10/2015 | Mahesh et al. |
| 2015/0341212 A1 | 11/2015 | Hsiao et al. |
| 2016/0092045 A1 | 3/2016 | Lamas et al. |
| 2016/0224531 A1 | 8/2016 | Robichaud et al. |
| 2016/0224614 A1 | 8/2016 | Robichaud et al. |
| 2016/0224618 A1 | 8/2016 | Robichaud et al. |
| 2016/0224619 A1 | 8/2016 | Robichaud et al. |
| 2016/0224624 A1 | 8/2016 | Robichaud |
| 2016/0224643 A1 | 8/2016 | Robichaud |
| 2016/0224659 A1 | 8/2016 | Robichaud |
| 2016/0224804 A1 | 8/2016 | Carasso |
| 2016/0350950 A1 | 12/2016 | Ritchie et al. |

(56) References Cited

U.S. PATENT DOCUMENTS

| | | |
|---|---|---|
| 2017/0011229 A1 | 1/2017 | Jones-Mcfadden et al. |
| 2017/0139996 A1 | 5/2017 | Marquardt et al. |
| 2017/0286038 A1 | 10/2017 | Li et al. |
| 2017/0286455 A1 | 10/2017 | Li et al. |
| 2017/0286525 A1 | 10/2017 | Li et al. |
| 2017/0322959 A1 | 11/2017 | Tidwell et al. |
| 2018/0032706 A1 | 2/2018 | Fox et al. |
| 2018/0089303 A1 | 3/2018 | Miller et al. |
| 2018/0089561 A1 | 3/2018 | Oliner et al. |
| 2018/0314853 A1 | 11/2018 | Oliner et al. |
| 2019/0098106 A1 | 3/2019 | Mungel et al. |
| 2019/0146978 A1 | 5/2019 | Beedgen et al. |
| 2019/0268354 A1 | 8/2019 | Zettel, II et al. |
| 2020/0125725 A1 | 4/2020 | Petersen et al. |
| 2020/0135337 A1 | 4/2020 | Athey et al. |
| 2020/0143054 A1 | 5/2020 | Cohen et al. |
| 2020/0336505 A1 | 10/2020 | Neuvirth et al. |
| 2021/0117232 A1 | 4/2021 | Sriharsha et al. |
| 2021/0117425 A1 | 4/2021 | Rao et al. |
| 2021/0117868 A1 | 4/2021 | Sriharsha |
| 2021/0133634 A1 | 5/2021 | Ma et al. |
| 2021/0374112 A1 | 12/2021 | Nagai et al. |

OTHER PUBLICATIONS

Carasso, D., "Exploring Splunk: Search Processing Language (SPL) Primer and Coockbook," Splunk, pp. 156 (Apr. 2012).

Carasso, D., "Field Extractor App (Walkthrough)," [online video excerpts], YouTube, Jul. 12, 2013, Retrieved from the Internet: <https://www.youtube.com/walch?v=Gfl9Cm9v64Y> on Jun. 17, 2014, last accessed on May 19, 2015, pp. 2.

Carasso, D., "Semi-Automatic Discovery of Extraction Patterns for Log Analysis," Splunk Inc., pp. 3 (2007).

Ennis, Mark; "Headache relief for programmers:: regular expression generator," Aug. 13, 2007, http://txt2re.com/?s=15:Jan:2016, accessed on Jan. 15, 2016, p. 1.

"iTunes 10 for Mac: Create a Smart Playlist", Apple, Nov. 27, 2012, accessed at http://support.apple.com/kb/PH1739?viewlocale=en_US, accessed on Feb. 18, 2013, p. 1.

Patel, D., et al., "An evaluation of techniques for image searching and browsing on mobile devices," Published in: Proceeding SAICSIT '09 Proceedings of the 2009 Annual Research Conference of the South African Institute of Computer Scientists and Information Technologies, pp. 60-69 (Oct. 2009).

Tong, H.H., et al., "Fast mining of complex time-stamped events," Proceeding CIKM '08 Proceedings of the 17th ACM conference on Information and knowledge management, pp. 759-767 (Oct. 26-30, 2008).

Kalmanek, C.R., et al., "Darkstar: Using exploratory data mining to raise the bar on network reliability and performance," 2009 7th International Workshop on Design of Reliable Communication Networks, pp. 1-10 (2009).

Wang, M., et al., "Event Indexing and Searching for High Volumes of Event Streams in the Cloud," 2012 IEEE 36th Annual Date of Conference Published in Computer Software and Applications Conference (COMPSAC), pp. 405-415 (Jul. 16-20, 2012).

"RegexBuddy Demo-Self-Running Demonstration," RegexBuddy.com, Oct. 28, 2012, accessed at http://www.regexbuddy.com/democreate.html, accessed on Feb. 18, 2013, pp. 2.

Riloff, E., et al., "Learning Dictionaries for information Extraction by Multi-Level Bootstrapping," Proceedings of the Sixteenth National Conference on Arlilicial Intelligence, pp. 6 (Jul. 1999).

Soderland, S., et al., "Issues in Inductive Learning of Domain-Specific Text Extraction Rules," Proceedings of the Workshop on New Approaches to Learning for Natural language Processing at the Fourteenth International Joint Conference on Artificial Intelligence, pp. 6 (Aug. 1995).

Splunk, Splunk User Manual Version 4.1, pp. 181 (Year: 2011).

Txt2re.com Google Search, hllps://www.google.com/search?q=txt2re.com&biw=1536&bih=824&source=Int&tbs=cdr..., accessed on Jan. 19, 2016, pp. 2.

\* cited by examiner

Extract Fields
Specify your data source, then highlight the text you would like to extract.

Specify your data source
[ Sourcetype ▼ ]   [ syslog ▼ ]

Extraction Rule Preview
When you select text, we will give you a preview of the extraction rule you have created.
Or you can manually enter and/or edit an extraction rule by clicking the button below.

( Create extraction rule )

☐ Dim fields that are already extracted.
Filter: [           ]   Show: [ All ▼ ]   Result type: [ Latest ▼ ]

( Save this extraction )

| Timestamp ▼ | | Time of Day/24u ▼ | | | | Weekday ▼ | |
| Timestamp | MM/DD/YY | Time | IP | FIELD 3 | HASH | MAILBOX ID | ... | FIELD N | PID |
| 2012-12-17 10:35:38 -0800 | Dec 12 2012 | 10:35:38 | 155.1.2.55 | 18:35:38.265Z | be6dfe05.d18 | 827ad1d8 | | Wednesday | user |
| 2012-12-17 10:35:38 -0800 | Dec 12 2012 | 10:35:38 | 155.1.2.55 | 18:35:38.266Z | be6dfe05.d19 | 827ad1d8 | | Wednesday | user |
| 2012-12-17 10:58:59 -0800 | Dec 12 2012 | 10:58:59 | 155.1.2.55 | 18:58:59.267Z | be6dfe05.d18 | 827ad1d8 | | Wednesday | user |

*FIG. 6A*

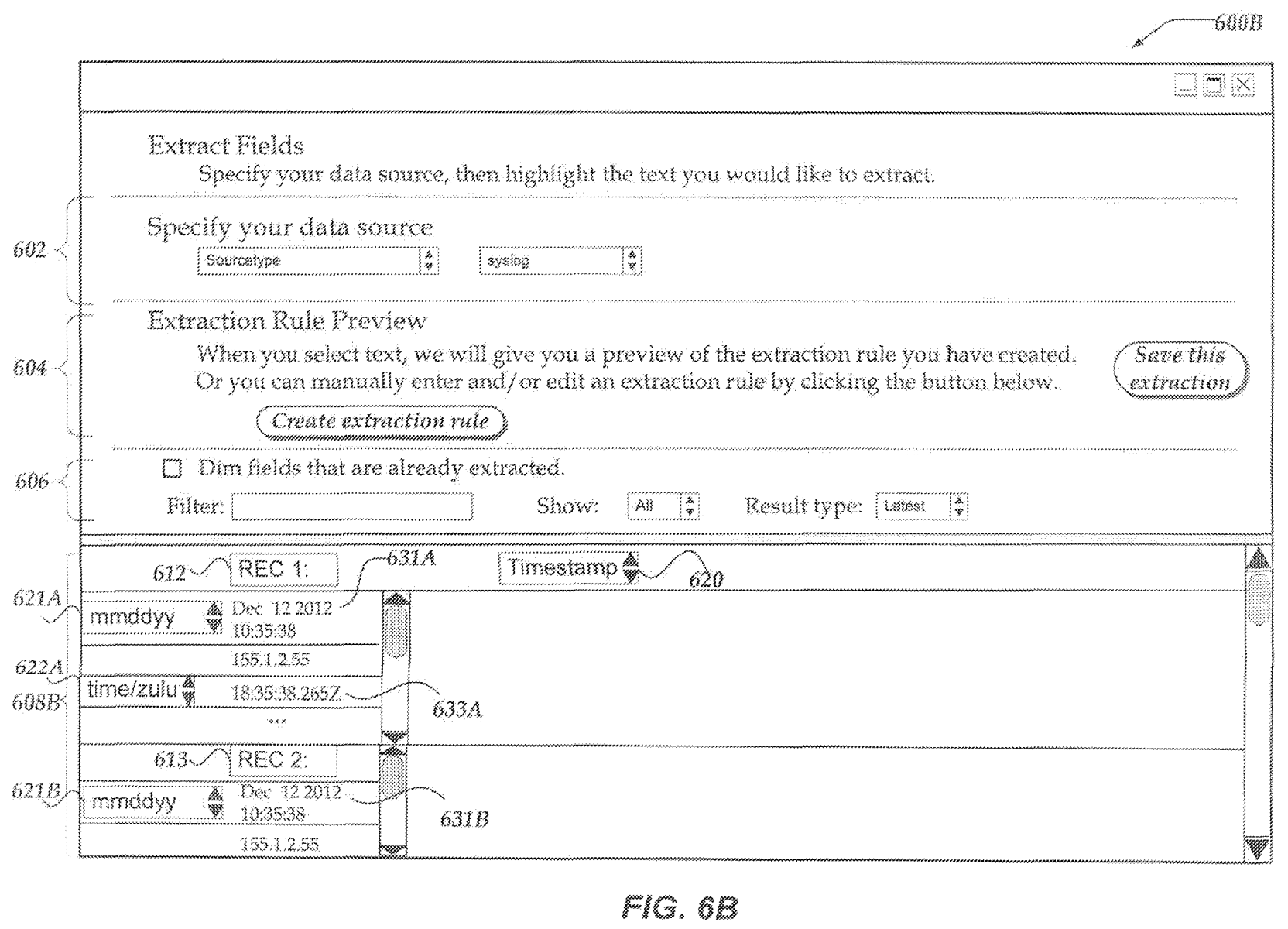

Extract Fields
Specify your data source, then highlight the text you would like to extract.

Specify your data source
Sourcetype: [syslog]

Extraction Rule Preview
When you select text, we will give you a preview of the extraction rule you have created. Or you can manually enter and/or edit an extraction rule by clicking the button below.

(Create extraction rule)

☐ Dim fields that are already extracted.
Filter: [ ]   Show: [All]   Result type: [Latest]

(Save this extraction)

Timestamp

REC 1:
mmddyy  Dec 12 2012
        10:35:38
        155 12.55
time/zulu  18:35:38.2657
...

REC 2:
mmddyy  Dec 12 2012
        10:35:38
        155 12.55

FIG. 6B

Extract Fields
Specify your data source, then highlight the text you would like to extract.

Specify your data source
Sourcetype: syslog

Extraction Rule Preview
When you select text, we will give you a preview of the extraction rule you have created.
Or you can manually enter and/or edit an extraction rule by clicking the button below.

(Create extraction rule)

☐ Dim fields that are already extracted.

Filter: _____  Show: All ▾  Result type: Latest ▾

(Save this extraction)

| FIELD 1: | mm/dd/yy ▾ | | Timestamp ▾ | | |
|---|---|---|---|---|---|
| REC 1: | Dec 12 2012 10:35:38 | 155.1.2.55 | 18:35:38.265Z | be6dfed5.d8 | 827ad1d8 |
| REC 2: | Dec 12 2012 10:35:38 | 155.1.2.55 | 18:35:38.266Z | be6dfed5.d8 | 827ad1d8 |
| ... | | | | | |

| FIELD 3: | Time/zulu ▾ | | | | |
|---|---|---|---|---|---|
| REC 1: | 18:35:38.265Z | be6dfed5.d8 | 827ad1d8 | ... | |

*FIG. 6C*

USING A TIMESTAMP SELECTOR TO SELECT A TIME INFORMATION AND A TYPE OF TIME INFORMATION

CROSS-REFERENCE TO RELATED APPLICATIONS

This application is a Continuation of U.S. application Ser. No. 16/394,754, filed Apr. 25, 2019, which itself is a Continuation of U.S. patent application Ser. No. 15/582,599 filed Apr. 28, 2017, which is a Continuation of U.S. patent application Ser. No. 13/747,177 filed Jan. 22, 2013. The entire contents of each of the foregoing being incorporated by reference herein.

BACKGROUND

The rapid increase in the production and collection of machine-generated data has created large data sets that are difficult to search and/or otherwise analyze. The machine data can include sequences of records that may occur in one or more usually continuous streams. Further, machine data often represents activity made up of discrete events.

Often, search engines may receive data from various data sources, including machine data. In some cases, search engines may be configured to transform the received data in various ways prior to storing it. At least one of the transformations may include extracting field values from the received data. Sometimes the received data may be unstructured, which may make it difficult for systems to efficiently analyze the received data to determine what data may be of interest and/or how to generate a field value extraction rule. This may be especially true where the datasets are considered extremely large, such as terabytes or greater. Such large datasets may make it difficult and time consuming to analyze the data so as to be able to perform various actions on the data. For example, determining extraction rules, modification rules, or the like on such large datasets that are correct and effective may be difficult and time consuming. Improper and/or ineffective rules may result in improper values from the received data and/or omit significant values. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein:

FIGS. 6A-6C illustrate various non-limiting, non-exhaustive graphical user interfaces usable for identifying one or more locations within records with splittable timestamp information.

DETAILED DESCRIPTION

Figure 1:
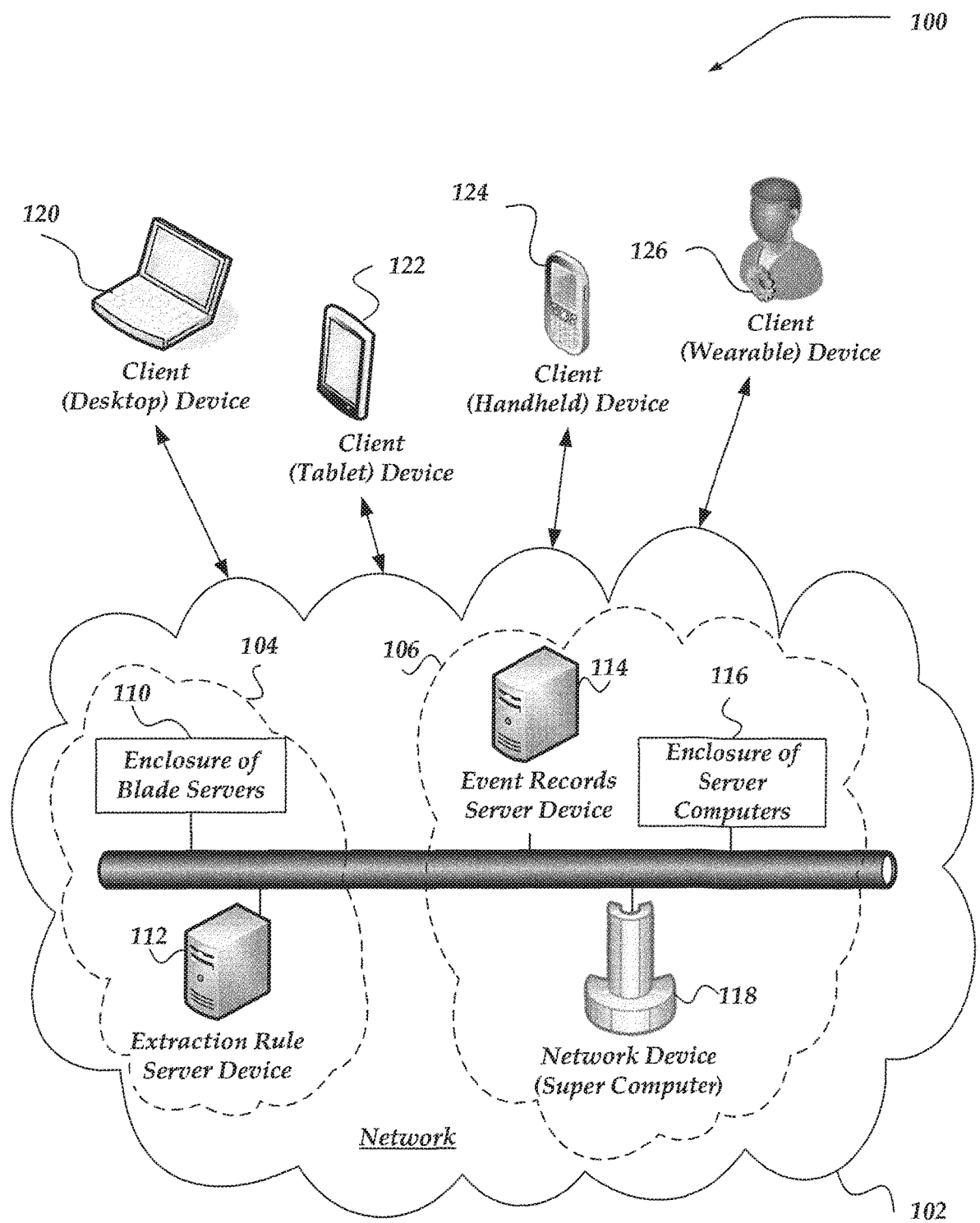
FIG. 1 illustrates a system environment in which various embodiments may be implemented.

Various embodiments now will be described more fully hereinafter with reference to the accompanying drawings which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims the following terms take the meanings explicitly associated herein, unless the context clearly dictates otherwise. The phrase: "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "machine data" as used herein may include data generated by machines, including, but not limited to, server logs or other types of event data, including event records. In at least one of various embodiments, machine data streams may be time stamped to create time stamped events. For example, information processing environments, such as, firewalls, routers, web servers, application servers, and databases may generate streams of time series data in the form of events. In some cases, events may be generated hundreds or thousands of times per second. In some embodiments, the machine data may be unstructured data, structured data, and/or a combination thereof. Unstructured data may refer to data that does not include at least one pre-defined field.

The term "extraction rule" and/or "data field extraction rule" may refer to instructions that may be applied to identify and extract field values from data, such as event records. In some embodiments, extraction rule may define a field within event records from which to extract a value. In at least one of various embodiments, the extraction rules may include regular expressions. The data from which extraction rules may be applied may include structured and/or unstructured machine data, indexed, non-indexed, event records, or other type of data.

The term "regular expression" as used herein refers to a sequence of constants and operators arranged into expressions for matching a set of strings. A regular expression is often defined as a pattern matching language which can be employed to identify character strings, for example, to select specific strings from a set of character strings. More particularly, regular expressions are often defined as a context independent syntax that can represent a wide variety of character sets and character set orderings. In operation, regular expressions can be employed to search data based upon a predefined pattern or set of patterns. As such, this pattern matching language employs a specific syntax by which particular characters or strings are selected from body of text. Although simple examples of regular expressions can be easily understood, oftentimes, the syntax of regular expressions are so complex that even the most experienced programmers have difficulty in understanding them. Regular expressions may be constructed using a variety of computer languages and constructs. In addition to matching, some regular expression systems offer functionality, such as, substitution, grouping, back references, or the like. Regular expressions and regular expression systems may be adapted to work with non-string data providing matching facilities for binary data.

The tern "event record" may refer to computing data that is collected about an event for a computing system, including, for example, an. action, characteristic, condition (or state) of the computing system. For example, such events may be about a computing system's performance, actions taken by the computing system, or the like. Event records may be obtained from various computing log files generated by the computer's operating system, and/or other monitoring application. However, event records are not restricted by a file format or structure from which the event data is obtained. In various embodiments, event records may include structured and/or unstructured machine data.

The phrase "location within an event record" refers to one or more sequential characters (e.g., a string) within the event record. The location with the event record, in some embodiments, may be definable based on various delimiters used to separate portions of the event record. However, the location within the event record may also be definable based on a characteristic of the data within the event record that might be used in an extraction rule; based on a starting column or position within the event record; or any of a variety of other criteria.

The following briefly describes embodiments in order to provide a basic understanding of sonic aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards providing a graphical user interface usable to identify one or more locations within event records with splittable timestamp information. A display of a plurality of event records is provided to a user through a display interface device using any of a variety of formats. A splittable timestamp selector is displayed that allows the user to select one or more locations within event records as having time information that may be split across the: one or more locations. For example, the user might select one location within the event records as having date information, another location as having time of day information, and yet another location as having day of the week information, or so forth. The subject innovations are not limited however to these non-limiting, non-exhaustive examples for splitting timestamp information across locations within the event records, and other arrangements and/or allocations are also allowed. Therefore, in some embodiments, the user might uniquely identify a decomposition or splitting for the timestamps. Any of a plurality of mechanisms may then be used to associate the selected locations with the split timestamp information, including, but not limited to tags, labels, or additional field header information within the event records. In other embodiments, a separate table, list, index, or the like, may be generated that associates the locations within the event records with the split timestamp information. Moreover, the graphical user interface displays such relationship, illustrating which locations within the event records are associated with which portion of the split timestamp information.

While the plurality of event records may be configured to include structured data having definable locations, such as fields, columns, or the like, based on separators, field headers, or so forth, subject innovations discussed herein are not limited to structured data event records. Selection of locations may also be performed over unstructured data event records. For example in some embodiments, an analysis might be performed that provides extraction rules, or the like, that may identify locations within the unstructured data event records having time information. The event records may be displayed through the graphical user interface to enable the user to select locations over which to split the timestamp information.

It should be noted that while the subject innovations discussed herein disclose splitting timestamp information across locations within event records, the subject innovations are not constrained to timestamp information. Thus, in some embodiments, other splitting information might also employ similar selectors. For example, information about geographic regions might be split across various locations within event records, such as country information for one location within the event records, state or district information for another location within the event records, and city or town information for still another location within the event records. Virtually any information that can be split for use in identifying different locations within event records may be used.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include extraction rule server device 112, event records server device 114, enclosure of blade servers 110, enclosure of server computers 116, super computer network device 118, and the like. Although not shown, one or more client devices may be included in cloud network 102 in one or more arrangements to provide one or more network services to a user. Also, these arrangements of networked computing devices may or may not be mutually exclusive of each other.

In at least one of the various embodiments, extraction rule server device 112 may include module, processes, components, services, or the like, for generating extraction rules for extracting fields from event records. Further, in at least one of the various embodiments, event records server device 114 may include processes, modules, services, components, or the like, for collecting and managing data event records. In at least one of the various embodiments, event records server device 114 may employ extraction rules provided by extraction rule server 112 for managing event records, or other forms of data.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, server computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3, Generally, client devices may include virtually any substantially networked computing device capable of communicating over a wired wireless, or some combination of wired and wireless network.

In various embodiments, network 102 may employ virtually any form of communication technology and topology. For example, network 102 can include local area networks, Personal Area Networks (PANs), (LANs), Campus Area Networks (CANs), Metropolitan Area Networks (MANs), Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), 5 (5G) generation wireless access technologies, and the like, for mobile devices These wired and wireless access technologies may also include Global System for Mobile communication (GSM), General. Packet Radio Services (GPRS), Enhanced Data GS1.4 Environment (EDGE), Code Division Multiple Access (CDMA), Wideband Code Division. Multiple Access (WCDMA), Long Term Evolution Advanced (LTE), Universal Mobile. Telecommunications System (UMTS), orthogonal frequency-division multiplexing (OFDM), Wideband Code Division Multiple Access (W-CDMA), Code Division Multiple Access 2000 (CDMA2000), Evolution-Data Optimized (EV-DO) High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, and the like.

Enclosure of Blade Servers

Figure 2A:
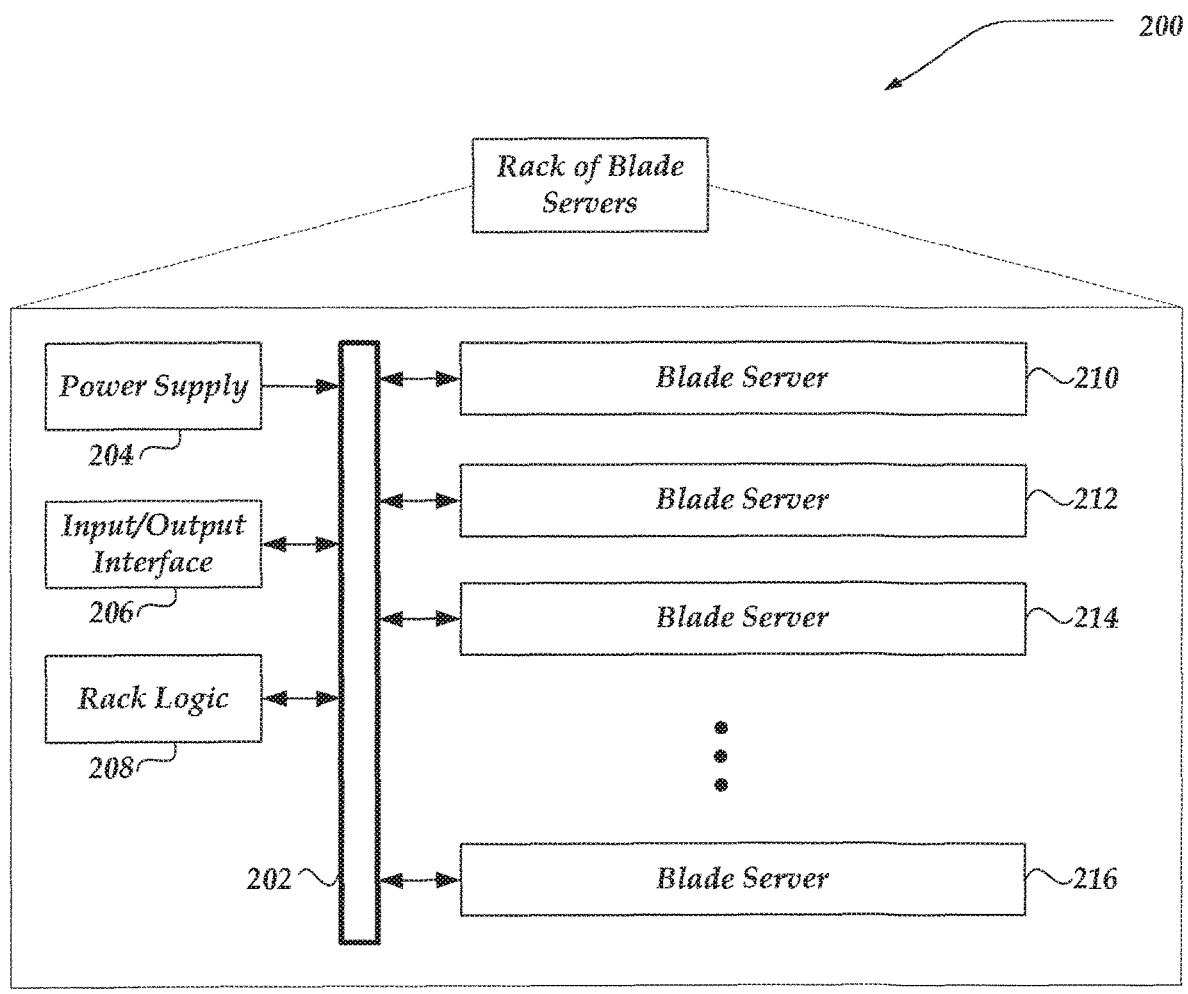
FIG. 2A shows a rack of blade servers that may be included in various embodiments.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and enemy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
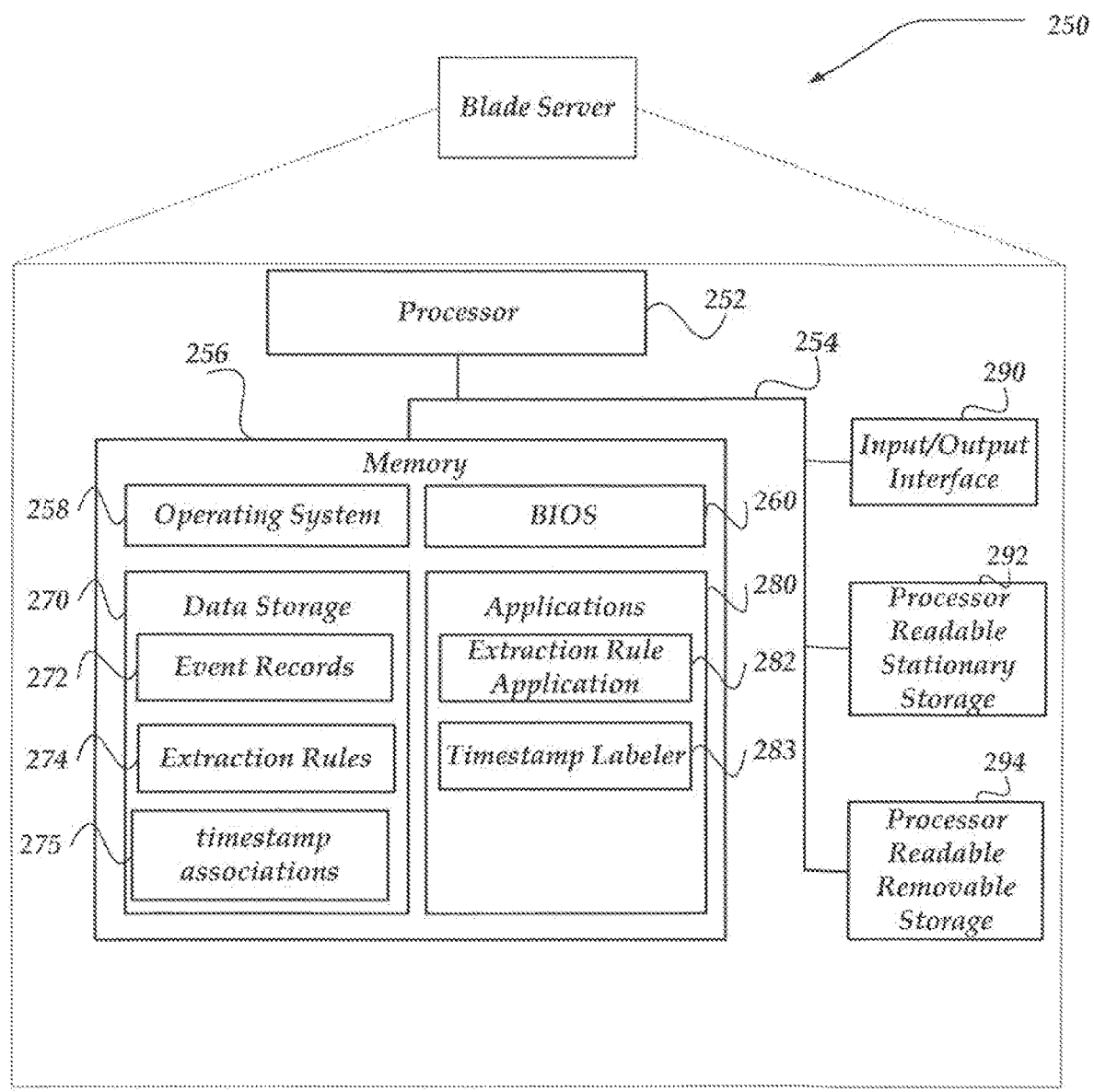
FIG. 2B illustrates an embodiment of a blade server that may be included in a rack of blade servers such as that shown in FIG. 2A.

FIG. 2B illustrates an illustrative-embodiment of blade server 250, which may include many more or fewer components than those shown. As shown in FIG. 2A, a plurality of blade servers may be included in one enclosure that shares resources provided by the enclosure to reduce size, power, and cost.

Blade server 250 may include processor 252 which communicates with memory 256 via bus 254. Blade server 250 may also include input/output interface 290, processor-readable stationary storage device 292, and processor-readable removable storage device 294, Input/output interface 290 can enable blade server 250 to communicate with other blade servers, client devices, network devices, and the like. Interface 290 may provide wireless and/or wired communication links for blade server. Processor-readable stationary storage device 292 may include devices such as an electromagnetic storage device (hard disk), solid state hard disk (SSD), hybrid of both an SSD and a hard disk and the like. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general purpose operating system may be employed such as a version of UNIX, or LINUX™, or a specialized server operating system such as Microsoft's Windows Server™ and Apple Computer's iOS Server.

Memory 256 may further include one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, event records 272, timestamp associations 275, and extraction rules 274, Timestamp associations 275 may include tags, labels, indices, tables, or other mechanisms usable to associate timestamp information with locations within event records.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, extraction rule application 282, and timestamp labeler 283. In some embodiments, timestamp labeler 283 may be configured to provide a graphical user interface usable to identify locations within an event record with splittable timestamp information. Timestamp labeler 283 is illustrated as a separate application, however, it should be understood that timestamp labeler 283 may operate within another application or be called through another application. Moreover, timestamp labeler 283 may employ a process such as described below in more detail in conjunction with FIG. 5 to perform at least some of its actions, Timestamp labeler 283 may further employ graphical user interfaces, such as those discussed below in conjunction with FIGS. 6A-6C.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Client Device

Figure 3:
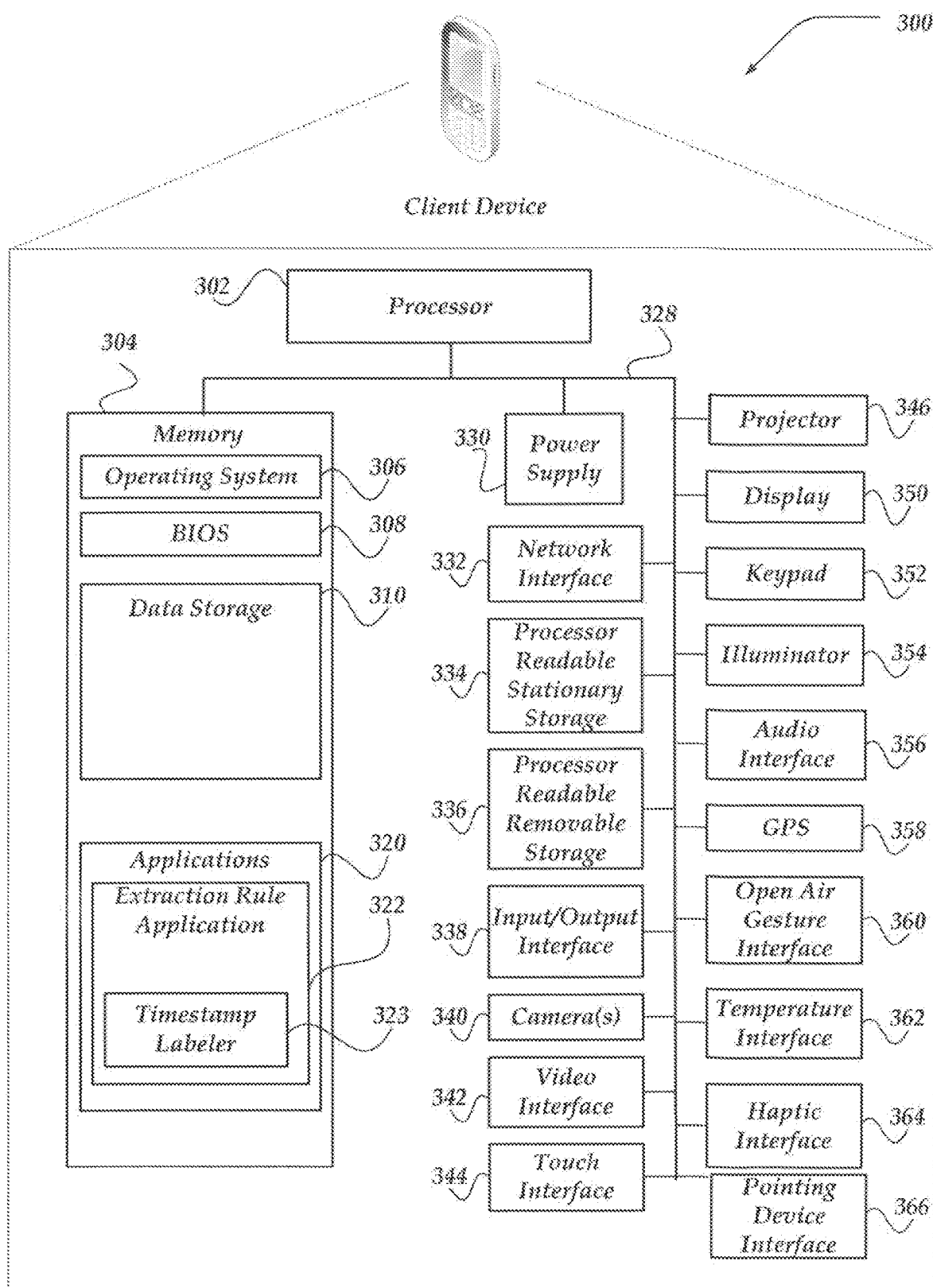
FIG. 3 shows a client device that may be included in various embodiments.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also. include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics linage sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 554 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™ and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control. (MAC) address, IP address, and the like.

Human interface components can be peripheral devices that are physically separate from client device 300, allowing for remote input and or output to client device 300. For example, information routed as described here through human interface components such as display 350 or keyboard 352 can instead be routed through network interface 332 to appropriate human interface components located remotely. Examples of human interface peripheral components that may be. remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wail or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general purpose operating system such as a version of UNIX, or LINUX™, or a specialized mobile computer communication operating system such as Windows Phone™, or the Symbian operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by client device 300, transmit, receive, and/or otherwise process instructions and data. Applications 320 may include, for example, extraction rule application 322. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Extraction rule application 322 may be configured to enable creation of extraction rules and to display results of the extraction rules to a user. In at least one embodiment, extraction rule application 322 may interact with and/or employed through a web browser. In some embodiments, embodiments, extraction rule application 322 may enable a user to input and/or edit one or more extraction rules. In other embodiments, extraction rule application 322 may display a plurality of event records to a user, values extracted from the event records using the extraction rule, statistics about the extracted values, or the like.

Also shown is timestamp labeler 323, which is configured to enable client device 300 to display and use a graphical user interface to identify one or more locations within an event record that may have time information, and to further allow the locations to be associated with splittable timestamp information. Such splittable timestamp information may then be usable to perform any of a variety of time related actions upon the event records, including, but not limited to performing sorts on the event records, or locations within the event records; performing extractions of information within the event records or locations within the event records; or performing any of a variety of analysis on the event records.

While timestamp labeler 323 is illustrated as within extraction rule application 322, this need not be the case in other embodiments, and thus should not be construed as limiting the subject innovations. For example, timestamp labeler 323 might operate as a separate application, called from another application, or even operate on another network device over a network. In some embodiments timestamp labeler 323 is configured to provide graphical user interfaces such as those discussed in more detail below in conjunction with FIGS. 6A-6C, and further employ a process such as discussed below in conjunction with FIG. 5.

Illustrative Network Device

Figure 4:
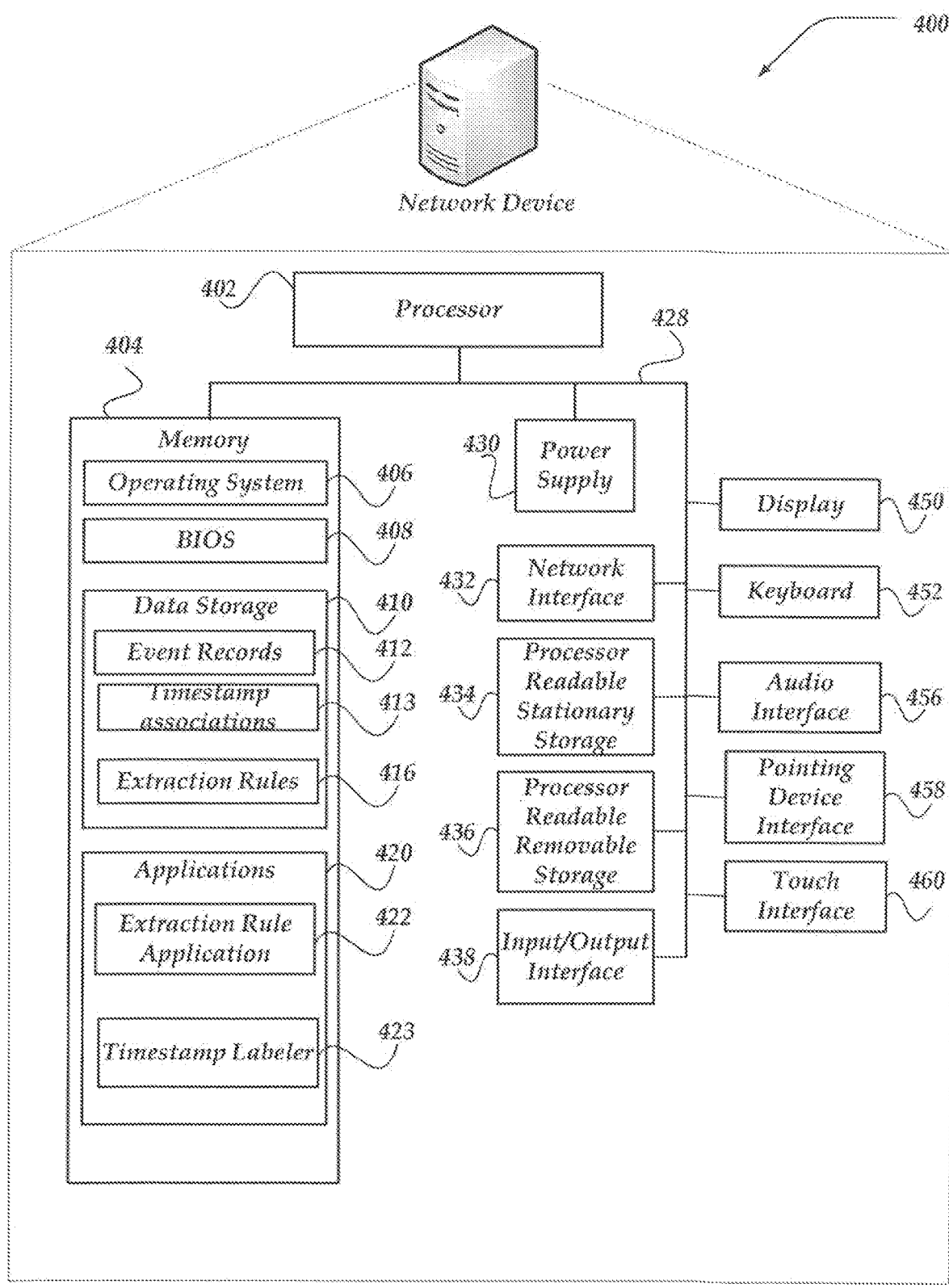
FIG. 4 illustrates a network device that may be included in various embodiments.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the figure, network device 400 may include a processor 402 in communication with a memory 404 via a bus 428. Network device 400 may also include a power supply 430, network interface 432, audio interface 456, display 450, keyboard 452, input/output interface 438, processor-readable stationary storage device 434, processor-readable removable storage device 436, and pointing device interface 458. Power supply 430 provides power to network device 400.

Network interface 432 may include circuitry for coupling network device 400 to one or more networks, and is constructed for use with one or more communication protocols and technologies including, but not limited to, protocols and technologies that implement any portion of the Open Systems Interconnection model (OSI model), GSM, CDMA, time division multiple access (TDMA), UDP, TCP/IP, SMS, MMS, GPRS, WAP, UWB, WiMax, SIP/RTP, or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™ Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components can include any component that allows the computer to take input from, or send output to, a human user of a computer.

Memory 404 may include RAM, ROM, and/or other types of memory. Memory 404 illustrates an example of computer-readable storage media (devices) for storage of information such as computer-readable instructions, data structures, program modules, or other data. Memory 404 may store BIOS 408 for controlling low-key operation of network device 40.0. The memory may also store operating system 406 for controlling the operation of network device- 400. It will be appreciated that this component may include a general-purpose operating system such as a version of UNIX, or LINUX™, or a specialized operating system such as Microsoft Corporation's Windows® operating system, or the Apple Corporation's iOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400.

Data storage 410 may include, for example, event records 412 and extraction rules 416. In some embodiments, event records 412 may store data, including a plurality of event records. In at least one of various embodiments, event records 412 may be stored by event records server device 114 of FIG. 1. Extraction rules 416 may include one or more extractions rules. These extraction rules may be automatically created based on a user selection of text, input by a user, and/or otherwise provided to the system. In at least one embodiment, extraction rules 416 may be stored and/or otherwise processed by extraction rule server device 112 of FIG. 1. Further, data Storage 410 may also include timestamp associations 413, where such associations might include tags, labels, indices, tables, lists, or the like. However, in other embodiments, modifications might be made to event records stored within event records 412 to indicate timestamp associations, including, modifying event records to include tags, labels, headers, additional fields, field information, or the like.

Applications 420 may include computer executable instructions which, when executed by network device 400, transmit, receive, and/or otherwise process messages (e.g., SMS, MMS, Instant Message (IM), email, and/or other messages), audio, video, and enable telecommunication with another user of another client device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs and so forth. Applications 420 may include, for example, extraction rule application 422 and timestamp labeler 423.

Extraction rule application 422 may be configured to enable creation of extraction rules and to display results of the extraction rules to a user. In at least one embodiment, extraction rule application 422 may interact with a client device for enabling a user to input and/or edit one or more extraction rules. In other embodiments, extraction rule application 422 may enable a client device to display a plurality of event records to a user, values extracted from the event records using the extraction rule, statistics about the extracted values, or the like. In at least one embodiment, extraction rule application 422 may interact with event records 412 and/or extraction rules 416 to access and/or store event records and/or extraction rules, respectively. In some embodiments, extraction rule application 422 may be employed by extraction rule server device 112 of FIG. 1.

Timestamp labeler 423 is configured to provide a graphical user interface usable to identify one or more locations within event records with splittable timestamp information. A display of a plurality of event records is provided to a user through the graphical user interface using any of a variety of formats, including those described below in conjunction with FIGS. 6A-C. A splittable timestamp selector is displayed within the graphical user interface that allows the user to select one or more locations within event records as having time related information that may be split across the one or more locations. The splittable timestamp information may then be associated with respective locations within the event records using any of a variety of mechanisms. The associations may be stored such that it may later be used by extraction rules, sort applications, and/or any of a variety of applications in which time information may be used. For example, timestamp labeler 422 might store the associations in event records 412, and/or in timestamp associations 413. Timestamp labeler 424 may employ a process such as described below in conjunction with FIG. 5.

General Operation

Figure 5:
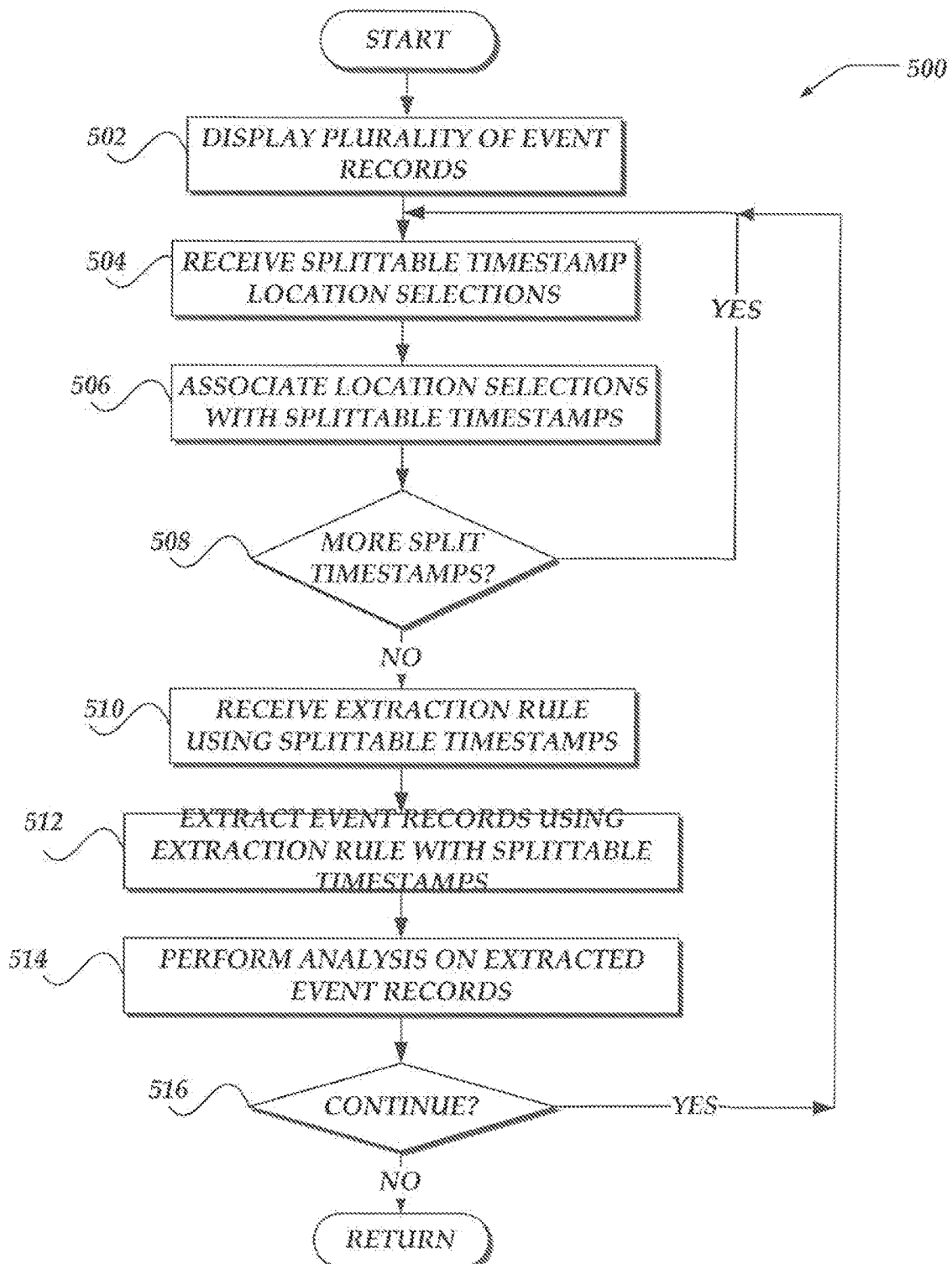
FIG. 5 illustrates a logical flow diagram generally showing one embodiment of an overview process for identifying one or more locations within a record with splittable timestamp information usable within extraction rules.

The operation of certain aspects of the invention will now be described with respect to FIG. 5. FIG. 5 illustrates a logical flow diagram generally showing one embodiment of an overview process for identifying one or more locations within an event record with split-table timestamp information. Process 500 of FIG. 5 may be implemented within one or more client devices of FIG. 1, blade server 250 of FIG. 2B, and/or network device 400 of FIG. 5.

Process 500 begins, after a start block, at block 502, where a plurality of event records are received, and one or more of the event records are displayed using a graphical user interface (GUI). The GUI may be implemented using any of a variety of mechanisms, and is not constrained to any particular mechanism for displaying the one or more event records. In some embodiments, the GUI may be displayed to a user of a client device, such as described above in conjunction with FIGS. 1 and 3. However, the GUI may also be configured to be displayed using any of a variety of other devices as well. Moreover, the display of the one or more event records may use any of a variety of formats and/or arrangements. For example, event records may be displayed in a table format having rows and columns. In such a display, each event record displayed might be a displayed row, while fields or locations within the event record are columns. In other embodiments, each event record displayed might be a column, while fields or locations within the event records are rows. As discussed further below, other arrangements may also be used.

Process 500 then flows to block 504, where the GUI also displays a splittable timestamp selector. The splittable timestamp selector might be represented as a pull down menu structure, a push button, a drag/drop selector, or any of a variety of other selector mechanisms, including a combination of one or more selector mechanisms. The splittable timestamp selector is configured to allow the user to identify locations within a displayed event record having portions of time information for which the user may select. For example, one location of the event record might include month/day/year information, while another location within the event record might include day of the week information, time of day information, or so forth. Clearly, an event record might include locations that include combinations of such time information, and/or other types of time information. Therefore, subject innovations are not limited to a particular structure, type, or combination of time information. Virtually any time information may be included for which a user might select.

In one non-limiting example, a user might identify locations within an event record having time information that is distributed across different fields or locations within an event record. For example, one fielder location within an event record might include time of day information in the form of time that is local to a source of the event record, and another location that includes universal time of day information. Another location of the event record might include, however, month/day/year information. Thus, time information might be distributed across different locations within an event record. Some of these locations within the event record however might not include a label, tag, header, or other type of indication that the content includes time information. The user might therefore wish to identify such locations as having a particular type of time information. Using the splittable timestamp selector within the GUI, the user may drag, slide, or otherwise identify and select locations within the event record as having time information, and what type of time information. The splittable timestamp selector allows the user to split timestamp information across different locations within the event record. The GUIs discussed below in conjunction with FIGS. 6A-C illustrate non-limiting examples of performing such selections.

Process 500 then moves to block 506 where as the user selects locations with split timestamp information, the splittable timestamp information is associated with the selected locations. This association may be accomplished using a variety of mechanisms. For example, a new field, header, tag, label, or the like might be automatically inserted in the event records, event record headers, or the like, that include the split timestamp information. However, in other embodiments, information about the selected locations might be inserted into a table, list, index structure, or the like, along with the associated split timestamp information. For example, the location within the event records might be identified as characters 26-31 and as having time information to be associated with the split timestamp of Month (2 characters), Day (2 characters), and Year (2 characters). Such information may be included in a table, list, index structure, or the like, that might be maintained separately, within another event record, or using any of a variety of other mechanisms.

Process 500 flows next to decision block 508 where a determination is made whether more splittable timestamp information is to be selected and associated with locations within the event records. If so, processing flows back to block 504 to continue until no more selections are performed. Processing then continues to optional block 510.

At block 510, a user may create an extraction rule that includes splittable timestamps within the rule. For example, the user might select event records where the MM/DD/YY time information, identified using the splittable timestamp, is greater than some value. As noted, any of a variety of other extraction criteria may be employed. As such, the subject innovations are not limited by this example. Proceeding to block 512, the extraction rule having splittable timestamp information is then used to extract event records that satisfy the extraction rule. Continuing to block 514, any of a variety of analyses might then be performed on the extracted event records.

Process 500 then flows to decision block 516, where a determination is made whether to continue identifying and selecting locations within event records with splittable timestamp information. If so, processing branches back to block 504; otherwise, processing may return to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Non-Limiting, Non-Exhaustive Examples of Graphical User Interfaces

FIGS. 6A-C illustrate various non-limiting, non-exhaustive graphical user interfaces usable for identifying/selecting one or more locations within event records with splittable timestamp information.

GUIs 600A-C of FIGS. 6A-C are directed towards providing examples of GUIs that may be used to display one or more event records and to select locations within the event records as having time information. The GUIs further display a splittable timestamp selector that may be used to select locations within the event records as having time information. The splittable timestamp selector may be used to identify the type of time information within the selected location. This splittable timestamp information may then be associated with the selected locations as discussed above.

GUI 600A of FIG. 6A illustrates event records 612-614, within section 608A. Other sections within GUI 600A may also be displayed, including, data source 602, which indicates a source of the event records; extraction rule preview 604, which may be used to create an extraction rule, and input 606 usable to enable the user to define a specific filter to apply to the event records (e.g., the user may filter the event records to display those event records that were recorded on a particular day). In other embodiments, input 606 may also enable a user to select how the event records are displayed.

As is further shown in FIG. 6A, event records 612-614 are displayed in a 'by row' format, where each row represents one event record. Also, shown as columns are locations 630-637 for each of event records 612-614. Where tags, labels, or field headers are available, they are further illustrated in row 610.

Splittable timestamp selector 620 is shown in FIG. 6A, having selection arrows that may be employed to select split time information. Splittable timestamp selector 620 may be clicked on, dragged, or otherwise moved, relocated over one or more columns/locations of the displayed event records 612-614 to select a location having time information. The selection arrows may be used to select a split time for the selected location. In one non-limiting, non-exhaustive example, a user might drag splittable timestamp selector 620 over location 631 and employ the selection arrows to identify that location 631 has month/day/year (MM/DD/YY) time information. A result of such actions is shown as splittable timestamp selection 621. Similar actions may be repeated, resulting in splittable timestamp selection 622 showing location 633 having time of day, in Zulu time; and splittable timestamp selection 623 showing location 636 having weekday time information. Thus, using GUI 600A, the user may employ-splittable timestamp selector 620 multiple-times, to select multiple locations within the displayed event records as having split time-information, However, other embodiments, splittable timestamp selection 621 might be dragged to another location to enable splitting of, for example, the MM/DD/YY time information. Thus, in some embodiments, a user might split the MM/DD/YY time information across two or more locations, such as MM for one location, DD for another location, and YY for still another location. Similarly, splittable timestamp selection 622 might also be further split. Thus, in some embodiments, the splittable timestamp selection 622 might be dragged over multiple locations, with selections made using splittable timestamp selection 622 as sort of an extension of splittable timestamp selector 620. Thus, in this manner, designating splits of time across locations within event records may be performed in a variety of ways.

It should be clear that any of a variety of other locations, and/or split time information may be selected. For example, in one embodiment, splittable timestamp selector 620 might allow a user to select to enter a definition of split time for locations. That is, in some embodiments, the user might define a unique splitting of time, or even a previously undefined timestamp designation. Moreover, in some embodiments, when a location within the displayed event records is selected, an association is made between the split time information and the selected location to indicate that the selection location has time information as indicated by the selected identifier (e.g., MM/DD/YY, time of day: Zulu, or weekday). Moreover, it should be understood that such association between the split time information and the location might be applied over a plurality of event records, including those event records that are displayed, or alternatively, over a subset of event records, such as event records extracted from the plurality of event records based on an extraction rule, or the like. In any event, the splittable timestamp location associations may then be used to perform any of a variety of operations upon the event records.

As noted above, subject innovations are not limited by how an event record, event record locations, and splittable timestamp information is displayed. Thus, while FIG. 6A illustrates event records 612-614 in rows, and columns as locations/fields within the event records, other arrangements may be used. For example, in some embodiments, event records might be displayed in columns, while locations/fields with the event records might be displayed in rows. Splittable timestamp information may then be displayed in a column, and aligned with respectively selected locations/rows within the event records.

For example, some data might have event records with too many extracted fields to readily display as columns. Therefore, in some embodiments, the fields of each event record might be displayed with one field per row for each event record, and then displaying event records one under another. A similar concept might include moving the splittable timestamp information between fields to indicate the one from which a timestamp might be extracted, or otherwise selected; however, in this instance the timestamp (or portions thereof) might move up or down between the fields rather than across columns.

FIG. 6B shows still another non-limiting, non-exhaustive arrangement of event records, locations/fields within event records, and how splittable timestamp information might be displayed. In this example, GUI 600B shows portions of event records 612-613. The event records are shown in single column, one event record below another event record. Shown for event record 612 are locations 631A and. 633A, while at least location 631B of event record 613 is displayed. A scrolling tool is shown next to each event record, allowing scrolling within each event record, to display respective locations/fields within an event record. Moreover a global scrolling tool is shown that allows for scrolling over the event records. Splittable timestamp selector 620 may again be used to select locations within the displayed event records as having time information, as discussed above. Thus, as shown, FIG. 6B shows results of a selection of field/location 631A as having split time information of MMDDYY, as shown by splittable timestamp selection 621A. In some embodiments, such selection in one event record may be automatically reflected within other event records. Thus, in some embodiments, splittable timestamp selection 621B might automatically be displayed to reflect selections of a similar field/location within another event record based one selection. Also shown is splittable timestamp selection 622A for location 633A of event record 612. While not displayed, a similar automatic selection might occur for event record 613, and/or other event records.

FIG. 6C illustrates still another non-limiting, non-exhaustive arrangement of event records, locations/fields within event records, and how splittable timestamp information might be displayed. In this example, GUI 600C, event records are again displayed in-row format, as in 612A, 613A, and so forth. However, a separate row is also shown for fields/locations selected as having time information. Thus, as shown row 641 illustrates that field 1 (location 631) of the event records 612-613 (as displayed by event records 612A and 613A) has time information as shown by splittable timestamp selection 621. Similarly, row 641 also shows that field 3 (location 633) of the event records 612-613 (and displayed as event records 612B and 613B) has time information as shown by splittable timestamp selection 622. In this example, then, GUI 600C might display multiple instances of an event record, as rows, with other rows indicating which field/location within the event records are selected using the splittable timestamp selector 620.

Other arrangements or structures, formats, or the like, may be used to display within a GUI event records and locations within the event records such that a user might select locations having time information using a splittable timestamp selector. Thus, embodiments should not be construed as being limited by any particular arrangement of event records, type of splittable timestamp selectors, or mechanisms used to select locations within event records.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method in a computing system, comprising:
causing display of a set of event records comprising machine data;
receiving a selection of a portion of an event record, wherein the selected portion of the event record comprises time information about time, day, or date that is selected via a timestamp selector being moved from an original location to a point proximate to the selected portion of the event record;
receiving a selection, via the timestamp selector, of a type of time information corresponding with the selected portion of the event record; and
causing display of an indication that the selected portion of the event record corresponds with the type of time information selected via the timestamp selector.

2. The method of claim 1, further comprising:
for each event record of the set of event records, using an extraction rule to extract a corresponding timestamp; and
storing the corresponding timestamps in a data store comprising a field-searchable data store.

3. The method of claim 1, further comprising automatically generating an extraction rule that extracts the selected portion of the event record.

4. The method of claim 1, further comprising causing the timestamp selector to be displayed concurrently with the set of event records.

5. The method of claim 1, further comprising:
causing the timestamp selector to be displayed concurrently with the set of event records, and
receiving a selection of an additional portion of the event record, the selection of the additional portion indicating moving the timestamp selector from the original location to a point proximate to the additional portion of the event record, wherein an extraction rule is generated that extracts the selected additional portion of the event record along with the selected portion of the event record.

6. The method of claim 1, further comprising:
causing to be displayed concurrently with the set of event records, in the original location, the timestamp selector, and
receiving a selection of an additional portion of the event record, the selection of the additional portion indicating moving the timestamp selector from the original location to a point proximate to the additional portion of the event record, wherein an extraction rule is generated that extracts the selected additional portion of the event record along with the selected portion of the event record, such that, after the selection of the portion of the event record and the selection of the additional portion of the event record are received, the timestamp selector is simultaneously displayed at both the point proximate to the selected portion of the event record and the point proximate to the additional portion of the event record.

7. The method of claim 1, further comprising:
automatically generating an extraction rule that extracts the selected portion of the event record;
using the extraction rule, extracting the selected portion of the event record;
creating a timestamp using the extracted portion of the event record;
associating the timestamp with the event record; and
storing the timestamped event record in a data store.

8. The method of claim 1, wherein the selection, via the timestamp selector, of the type of time information comprises input representing manipulating the moved timestamp selector to select one of a plurality of predefined types of time information available in association with the timestamp selector.

9. The method of claim 1, wherein the selection, via the timestamp selector, of the type of time information comprises input representing manipulating the moved timestamp selector to select from a drop-down element of the timestamp selector one of a plurality of predefined types of time information available in the drop-down element of the timestamp selector.

10. The method of claim 1 wherein the set of event records is displayed across two or more columns, and wherein the received selection of the portion of the event record selects one of the columns to select the portion of the event record displayed in that column.

11. The method of claim 1 further comprising:
creating a timestamp using an extracted portion of the event record, wherein creating the timestamp comprises:
modifying the extracted portion of the event record; and
creating the timestamp to include the modified extracted portion.

12. The method of claim 1 further comprising:
receiving a selection of an additional portion of the event record, the selection of the additional portion indicating moving the timestamp selector from the original location to a point proximate to the additional portion of the event record; and
receiving input specifying a second type of time information to which the additional portion of the event record corresponds.

13. The method of claim 1, wherein the event record comprises structured data or unstructured data.

14. A computing system, comprising:
a processor; and
computer storage memory having computer-executable instructions stored thereon which, when executed by the processor, configure the computing system to:
cause display of a set of event records comprising machine data;
receive a selection of a portion of an event record, wherein the selected portion of the event record comprises time information about time, day, or date that is selected via a timestamp selector being moved from an original location to a point proximate to the selected portion of the event record;
receive a selection, via the timestamp selector, of a type of time information corresponding with the selected portion of the event record; and cause display of an indication that the selected portion of the event record corresponds with the type of time information selected via the timestamp selector.

15. The computing system of claim 14, further comprising:
   causing to be displayed concurrently with the set of event records, in the original location, the timestamp selector, and
   receiving a selection of an additional portion of the event record, the selection of the additional portion indicating moving the timestamp selector from the original location to a point proximate to the additional portion of the event record, wherein an extraction rule is generated that extracts the selected additional portion of the event record along with the selected portion of the event record,
   such that, after the selection of the portion of the event record and the selection of the additional portion of the event record are received, the timestamp selector is simultaneously displayed at both the point proximate to the selected portion of the event record and the point proximate to the additional portion of the event record.

16. The computing system of claim 14, further comprising:
   automatically generating an extraction rule that extracts the selected portion of the event record;
   using the extraction rule, extracting the selected portion of the event record;
   creating a timestamp using the extracted portion of the event record;
   associating the timestamp with the event record; and
   storing the timestamped event record in a data store.

17. The computing system of claim 14, wherein the selection, via the timestamp selector, of the type of time information comprises input representing manipulating the moved timestamp selector to select one of a plurality of predefined types of time information available in association with the timestamp selector.

18. The computing system of claim 14, wherein the selection, via the timestamp selector, of the type of time information comprises input representing manipulating the moved timestamp selector to select from a drop-down element of the timestamp selector one of a plurality of predefined types of time information available in the drop-down element of the timestamp selector.

19. One or more computer storage media having computer-executable instructions embodied thereon that, when executed by one or more processors, cause the one or more processors to perform a method, the method comprising:
   causing display of a set of event records comprising machine data;
   receiving a selection of a portion of an event record, wherein the selected portion of the event record comprises time information about time, day, or date that is selected via a timestamp selector being moved from an original location to a point proximate to the selected portion of the event record;
   receiving a selection, via the timestamp selector, of a type of time information corresponding with the selected portion of the event record; and
   causing display of an indication that the selected portion of the event record corresponds with the type of time information selected via the timestamp selector.

20. The computer storage media of claim 19, further comprising:
   receiving a selection of an additional portion of the event record, the selection of the additional portion indicating moving the timestamp selector from the original location to a point proximate to the additional portion of the event record; and
   receiving input specifying a second type of time information to which the additional portion of the event record corresponds.

\* \* \* \* \*